United States Patent
Gott et al.

(10) Patent No.: US 6,858,952 B2
(45) Date of Patent: Feb. 22, 2005

(54) POWER CONVERSION SYSTEM

(76) Inventors: Michael B. Gott, 2520 Mountain La., Upland, CA (US) 91784; Ted Cordts, 13355 Oaks Ave., Chino, CA (US) 91710

(*) Notice: Subject to any disclaimer, the term of this patent is extended or adjusted under 35 U.S.C. 154(b) by 168 days.

(21) Appl. No.: 10/367,383

(22) Filed: Feb. 14, 2003

(65) Prior Publication Data

US 2004/0160058 A1 Aug. 19, 2004

(51) Int. Cl.$^7$ .............................................. F04B 35/00
(52) U.S. Cl. ........................ 290/1 R; 60/325; 417/229
(58) Field of Search .................. 290/1 R, 45; 60/325, 60/533; 417/229

(56) References Cited

U.S. PATENT DOCUMENTS

| | | | |
|---|---|---|---|
| 1,771,200 A | 7/1930 | Akers | |
| 1,916,873 A | 7/1933 | Wiggins | |
| 2,020,361 A | 11/1935 | Johnston | 230/216 |
| 3,885,163 A | 5/1975 | Toberman | 290/1 |
| 4,004,422 A | * 1/1977 | Le Van | 60/533 |
| 4,081,224 A | * 3/1978 | Krupp | 417/229 |
| 4,173,431 A | 11/1979 | Smith | 417/229 |
| 4,212,598 A | 7/1980 | Roche et al. | 417/229 |
| 4,238,687 A | 12/1980 | Martinez | 290/1 |
| 4,239,974 A | 12/1980 | Swander | 290/1 |
| 4,239,975 A | 12/1980 | Chiappetti | 290/1 |
| 4,247,785 A | 1/1981 | Apgar | 290/1 |
| 4,322,673 A | * 3/1982 | Dukess | 322/35 |
| 4,339,920 A | 7/1982 | Le Van | 60/533 |
| 4,409,489 A | 10/1983 | Hayes | 290/1 |
| 4,418,542 A | 12/1983 | Ferrell | 60/668 |
| 4,434,374 A | 2/1984 | Lundgren | 290/1 |
| 4,437,015 A | 3/1984 | Rosenblum | 290/1 |
| 4,614,875 A | 9/1986 | McGee | 290/1 |
| 4,739,179 A | * 4/1988 | Stites | 290/1 R |
| 4,980,572 A | 12/1990 | Sen | 290/1 |
| 5,634,774 A | 6/1997 | Angel et al. | 417/229 |
| 6,091,159 A | 7/2000 | Galich | 290/1 |
| 6,172,426 B1 | 1/2001 | Galich | 290/1 |
| 6,204,568 B1 | 3/2001 | Runner | 290/1 |
| 6,353,270 B1 | 3/2002 | Sen | 290/1 |
| 6,362,534 B1 | 3/2002 | Kaufman | 290/1 |
| 6,376,925 B1 | 4/2002 | Galich | 290/1 |
| 6,767,161 B1 | * 7/2004 | Calvo et al. | 404/71 |

\* cited by examiner

*Primary Examiner*—Nicholas Ponomarenko
(74) *Attorney, Agent, or Firm*—Jeffrey G. Sheldon; Sheldon & Mak

(57) ABSTRACT

A power conversion system converts the horizontal momentum and downward forces of wheeled vehicles into a circular motion capable of driving a shaft, which can be used for generating electricity. The power conversion system includes a torque limiting device that minimizes the amount of reaction vehicle wheels experience when encountering an actuation member, minimizes the pressure required to depress the actuation member, introduces the rapid movement of passing wheeled vehicles gradually into the system, and prevents excessive loading at the drive shaft.

23 Claims, 6 Drawing Sheets

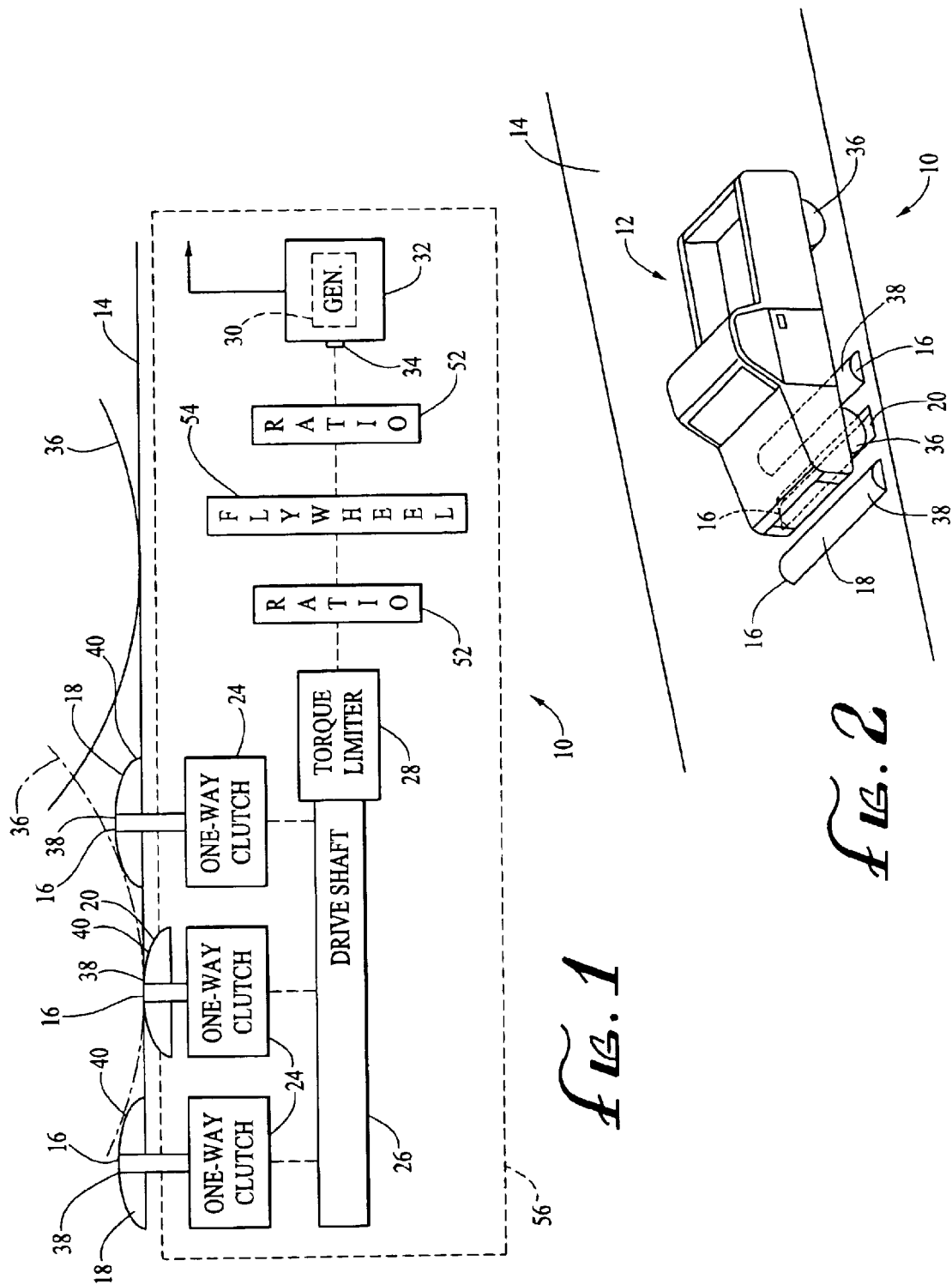

Fig. A

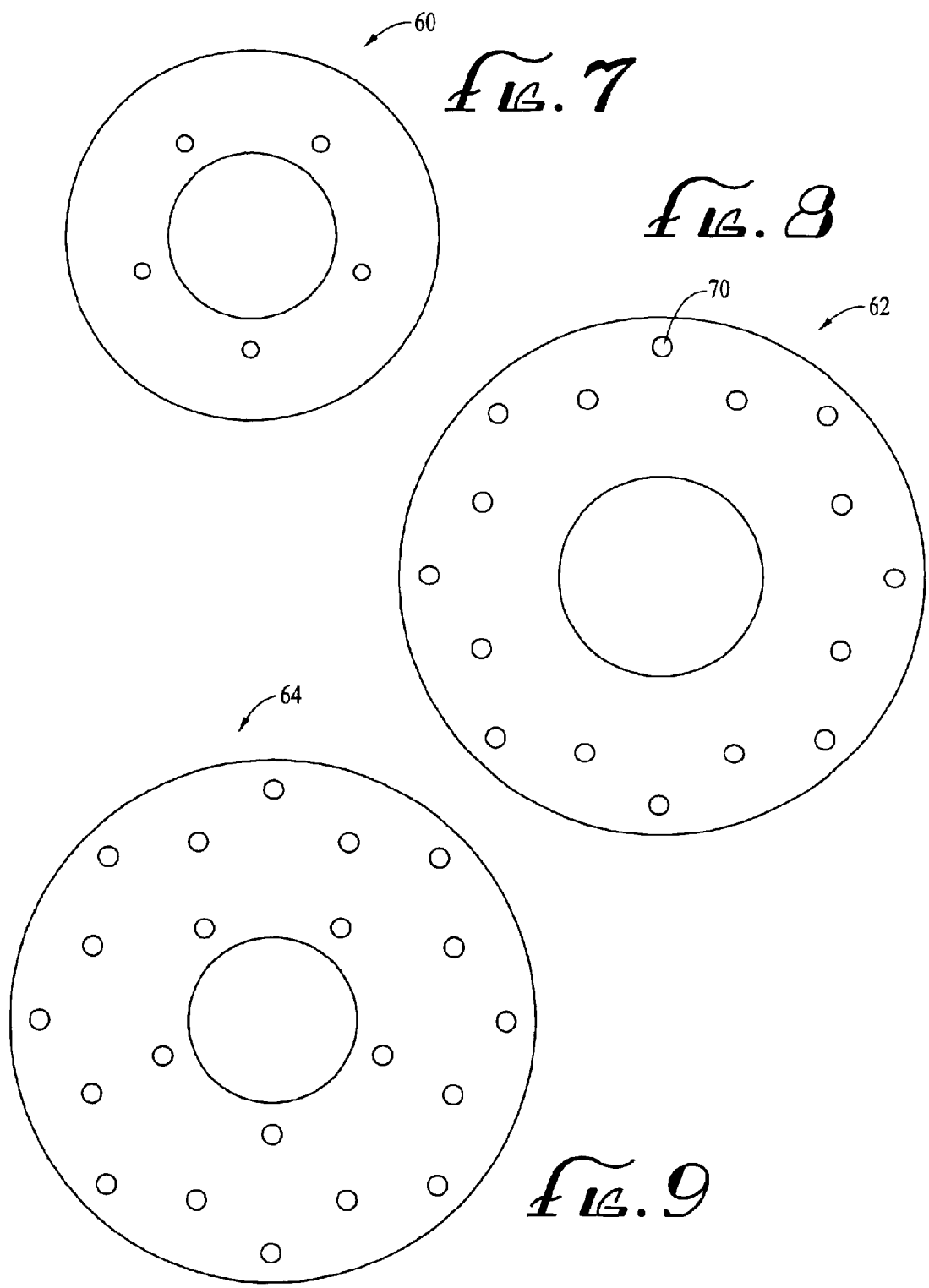

POWER CONVERSION SYSTEM

BACKGROUND

The present invention relates to energy recovery systems of the type used in roadways and other paths of rolling vehicles to generate electricity or perform other useful work.

As energy costs have risen and the environmental aspects of power production are more critical then ever before, it has become necessary to develop other avenues for the production of electricity and other forms of energy. The reliance of the modern world on electricity is ever increasing in a technological society; however, the ability to produce what is the lifeblood of an economy has been met with increasing environmental restrictions.

The predicted shortage of electricity has in recent times resulted in research and development of solar and wind power sources for the generation of electricity. Although these have practical uses there are obvious limitations related to weather patterns and land use priorities.

Another recognized source of potential power is the movement of vehicular traffic such as on highway and freeway systems. As populations have increased and urban sprawl has occurred, traffic and congestion has become increasingly concentrated and predictable. As early as 1929 the concept of recovering energy from vehicles moving over a roadbed was recognized (See U.S. Pat. No. 1,771,200 to Akers, entitled Traffic Air Compressor). U.S. Pat. No. 1,916,873 to Wiggins further discloses a roadway multi-treadle mechanism coupled through one-way clutches to an electric generator. Although many patents have been issued for devices such as these, none have apparently been commercially successful. Among the factors contributing to the lack of commercial success of the power conversion systems of the prior art, the following are believed to be significant:

1. They are inefficient in that they recover only a small portion of the energy taken from passing vehicles as useful work;
2. They are ineffective in that they are capable of producing only a small amount of useful work;
3. They are unreliable in that critical components are subject to breakage and/or excessive wear from shock loading; and
4. They are objectionable in that they subject passing vehicles to excessively rough passage.

Thus there is a need for a roadway power conversion system that efficiently produces meaningful amounts of power, that is reliable, long-lasting, easy to install, and inexpensive to provide, and that otherwise overcomes the disadvantages of the prior art.

SUMMARY

The present invention meets this need by providing a power conversion system for actuation by wheeled vehicles traversing a surface, comprising: an actuation member supported for movement between a first position projecting above the surface and a second position substantially flush with the surface; means for biasing the actuation member toward the first position thereof, the biasing means permitting movement of the actuation member to the second position thereof in response to engagement of the actuation member by a passing vehicle wheel; a rotatably mounted drive shaft; a one-way clutch coupled between the actuation member and the drive shaft for imparting unidirectional motion to the drive shaft in response to repetitive movement of the actuation member between the first and second positions thereof; a power conversion device having a rotor and a stator; and a torque-limiting device coupled between the drive shaft and the rotor.

In some embodiments, the torque limiting device can also function as a flywheel and comprise: a drive disc coupled to the drive shaft; a transfer disc coupled to the rotor; a pressure disc slidably attached to the transfer disc, wherein the drive disc is located between the transfer disc and the pressure disc; a first friction pad attached to the transfer disc and located between the drive disc and the transfer disc; a second friction pad attached to the pressure disc and located between the drive disc and the pressure disc; wherein the pressure disc is biased towards the transfer disc so that the drive disc will slip between the friction pads when the drive shaft applies an excessive torque to the drive disc.

DRAWINGS

These and other features, aspects, and advantages of the present invention will become better understood with reference to the following description, appended claims, and accompanying drawings, where:

FIG. 1 is a functional block diagram of a power conversion system according to the present invention;

FIG. 2 is a perspective view of the power conversion system of FIG. 1;

FIG. 7 is a side view of the drive disc of the torque limiting device of FIG. 6;

FIG. 8 is a side view of the pressure disc of the torque limit device f FIG. 6;

FIG. 9 is a side view of the transfer disc of the torque limiting device of FIG. 6.

DESCRIPTION

The present invention is directed to a power conversion system 10 for actuation by wheeled vehicles 12, such as automobiles or trains, traversing a surface 14. The power conversion system 10 converts the horizontal momentum and downward forces of wheeled vehicles 12 into a circular motion capable of driving a shaft, which can be used for generating electricity.

Figure 3:
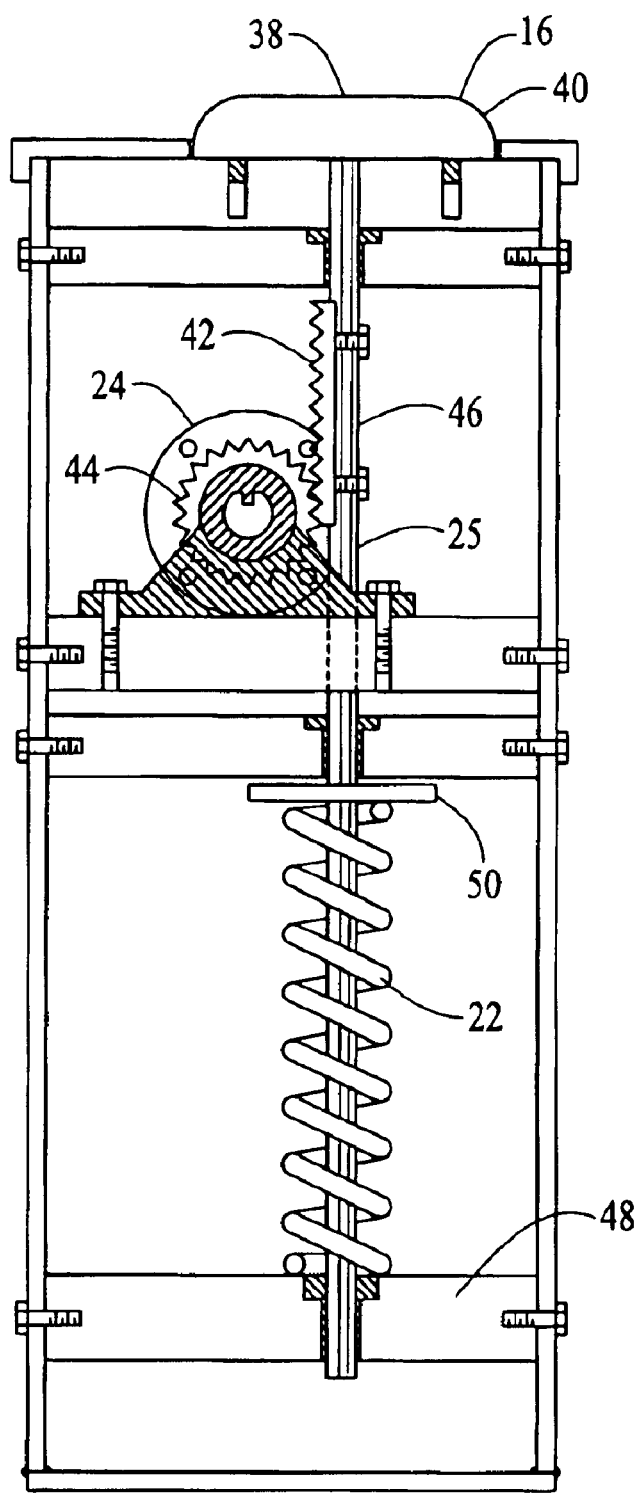
FIG. 3 is a side view of an actuation member, a biasing means, and a one-way clutch of the power conversion system of FIG. 1.
Figure 4:
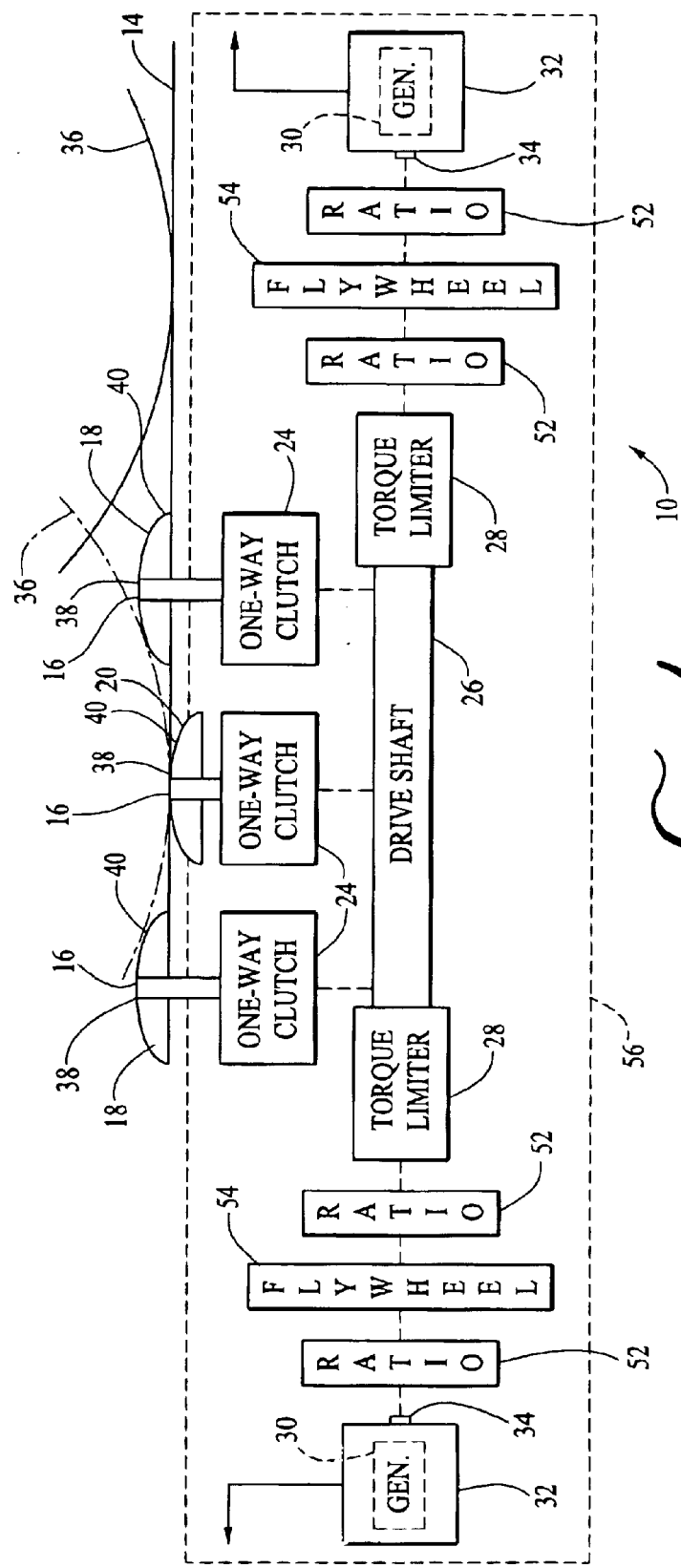
FIG. 4 is a functional block diagram of a second power conversion system according to the present invention.

Referring to FIGS. 1, 2 and 3 an actuation member 16 is supported for movement between a first position 18, projecting above a roadway surface 14, and a second position 20, substantially flush with the roadway surface. A means for biasing or biasing means 22, such as a spring, flexible piece of metal or plastic, retaining clip, or any other biasing means known in the art, biases the actuation member 16 toward the first position 18. The biasing means 22 permits the actuation member 16 to move to the second position 20 in response to engagement of the actuation member 16 by a passing wheeled vehicle 12. A one-way clutch 24 is coupled to the actuation member with a coupling 25. The one-way clutch couples the actuation member 16 to a rotably mounted drive shaft 26. The one-way clutch 24 imports unidirectional motion to the drive shaft 26 in response to repetitive movement of the actuation member 16 between the first and second positions. A torque limiting 28 device, such as a slip clutch, couples the drive shaft 26 to a rotor 34 of a power conversion device 32 having a rotor 34 and a stator 30, such as an electrical generator, for producing electrical power in response to rotation of the rotor. The torque limiting 28 device prevents excessive loading of the drive shaft 26 in response to the engagement of the actuation member 16 by passing vehicle wheels 36 so that the amount of reaction that vehicle wheels experience when encountering the actuation member 16 is minimized, the downward pressure and the pressure required to depress the actuation member is minimized, and the rapid movement of passing wheeled vehicles is introduced into the system gradually. The power conversion system 10 can also be configured so that there is a power conversion device 32 at both ends of the system as shown in FIG. 4.

The actuation member 16 can be a plunger or any other actuation member known in the art. The actuation member 16 preferably has a substantially cylindrical upper wheel-contacting surface 38 that is adapted for orientation substantially perpendicular to a projected path of the passing vehicle wheels 36. The leading portion 40 of the wheel-contacting surface 38 is preferably a ramp for facilitating smooth passage of vehicle wheels 36 during movement of the actuation member 16 from the first position 18 to the second position 20.

The coupling 25 of the actuation member 16 to the one-way clutch 24 can comprise a gear rack member 42 connected to the actuation member and a pinion 44 meshed with the gear rack member 42. The pinion 44 is arranged so that it drives the one-way clutch 24. The gear rack member 42 can be supported on an axially guided member 46, such as a compression rod, that is rigidly connected to the actuation member 16.

The biasing means 22 can comprise a compression spring oriented substantially parallel to the guided member 46 and so that opposite extremities of the compression spring are interposed between a stationary member 48 and a shoulder member 50 that is rigidly connected to the guided member 46. Alternatively, the biasing means 22 can comprise a flexible piece of metal or plastic, a retaining clip, mechanical linkage, or any other biasing means known in the art.

A ratio device 52 can be coupled in series between the drive shaft 26 and the power conversion device 32 or between the torque-limiting device 28 and the power conversion device. The ratio device 52 allows for operation of the power conversion device 32 at a different rotational speed than that of the drive shaft 26 when the torque-limiting device 28 is not being loaded to the limiting torque i.e., the actuation member does not move from the first to the second position frequently enough to sustain the RPM required to drive the power conversion device 32. The RPM required to drive the power conversion device 32 will depend on the power conversion device and other factors known in the art. The ratio device 52 can comprise a gear train, chain drive or any other ratio device known in the art.

A flywheel 54 can be coupled to the rotor 30 of the power conversion system 32 and the torque-limiting device 28 can be coupled in series between the drive shaft 26 and the flywheel 54. When the flywheel 54 is included in the system 10, two ratio devices 52 can be used, one coupled between the torque-limiting device 28 and the flywheel, and the other coupled between the flywheel and the rotor 30 of the power conversion device 32. However, one ratio device 52 can be used on either side of the flywheel 54 or no ratio devices can be used. The flywheel 54 preferably is weighted.

The actuation member 16 can be one of a plurality, such as three, of actuation members disposed along a roadway or railway surface 14 for serial engagement by the passing vehicle wheel 36, the biasing means 22, can be one of a corresponding plurality of biasing means, and the one-way clutch 24 can be one of a corresponding plurality of one-way clutches. The plurality of actuation members are preferably spaced as close together as practical. In some embodiments, the space between the actuation members can be 6–8 inches, for example.

A housing 56 for the power conversion system 10 can be used for installation beneath the roadway or railway surface 14. When a housing 56 is used, the plurality of longitudinally spaced actuation members 16 can be supported for independent movement relative to the housing between the respective first positions 18 and the second positions 20. The drive shaft 26 can be rotably supported relative to the housing 56 and longitudinally oriented under the roadway or railway surface 14.

In the embodiments shown, the weight and forward motion, i.e., momentum, of a vehicle 12 depresses an actuation member 16 about two inches until the actuation member is in the second position 20 flush with the roadway or railway surface 14. Then the vehicle wheels 36 rolls across the actuation member 16 and preferably encounters a second actuation member and then a third and possibly a fourth and so on. After a wheel 36 rolls off of an actuation member 16, the biasing means 22 forces the actuation member back to its first position 18. When multiple actuation members 16 are used, preferably each one can move between the first and second positions independently from the other actuation members and each actuation member can turn the drive shaft 26.

In the embodiments shown, the repeated depressing of the actuation member 16 and resulting rotation of the drive shaft 26 transfers rotation through the torque limiting device 28 to the ratio device 52, which is connected to the flywheel 54. The flywheel 54 will eventually reach an RPM that drives the power conversion device 32, thereby producing electricity.

Figure 5:
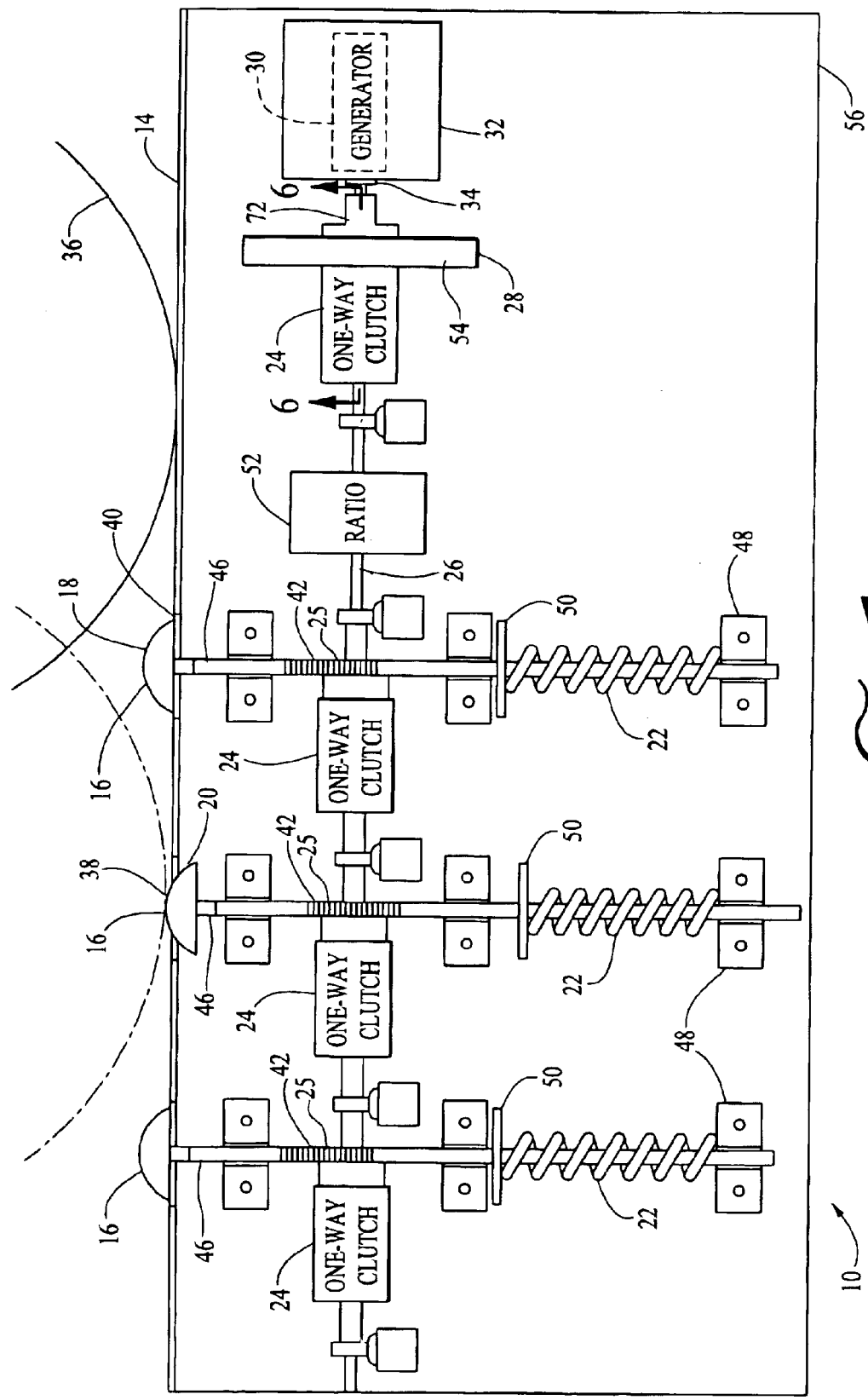
FIG. 5 is a functional block diagram of a third power conversion system according to the present invention.
Figure 6:
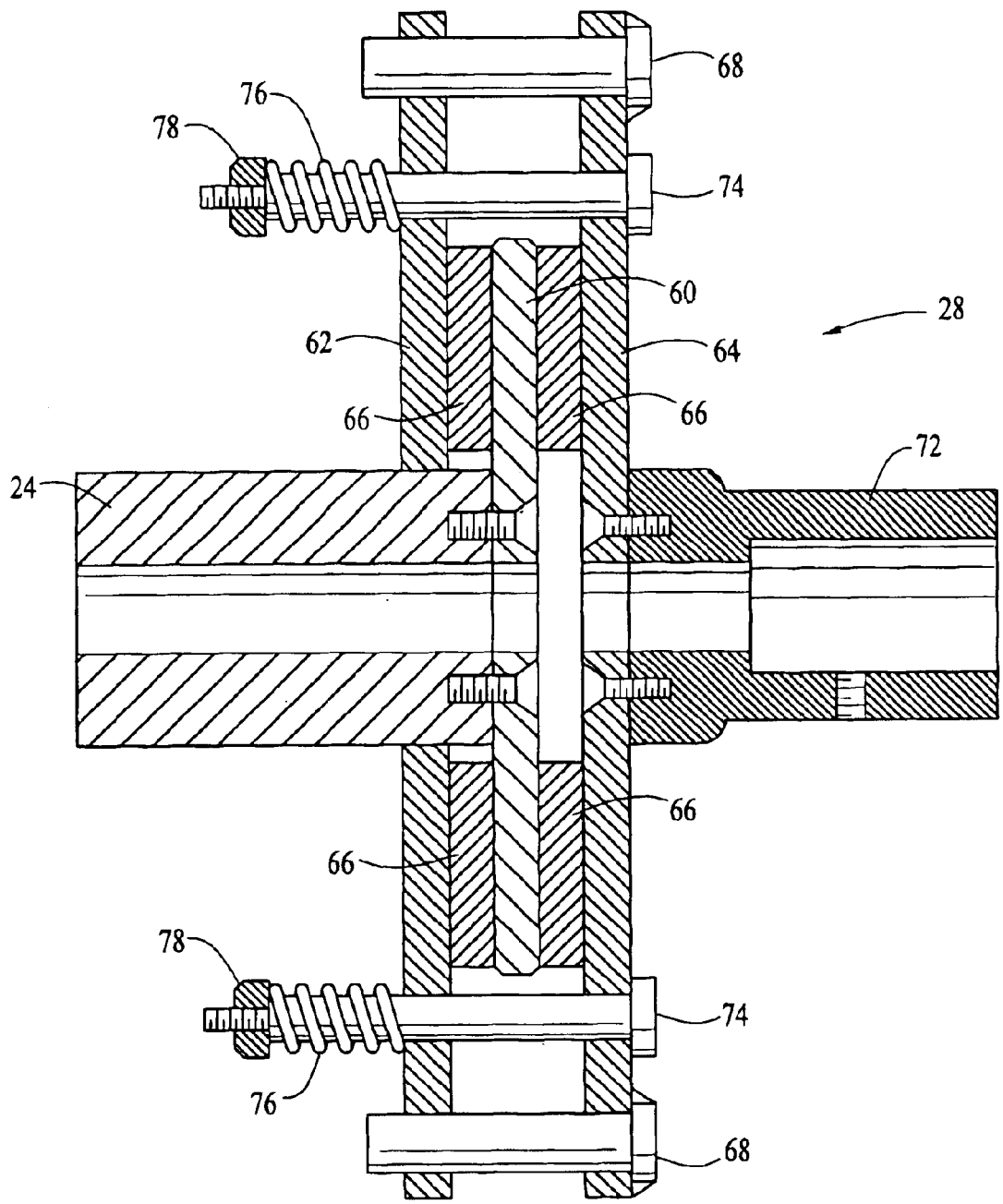
FIG. 6 is a cross-sectional view of the torque limiting device of the power conversion system of FIG. 5 without the rotor and drive shaft.

In one embodiment, shown in FIG. 5, the flywheel 54 is combined with the torque limiting device 28. The torque limiting device 28 can be seen in detail in FIG. 6. The torque limiting device 28 has a drive disc 60, shown in FIG. 7, which is fixedly coupled to a one-way clutch 24. The one-way clutch 24 is preferably splined or keyed for coupling with the drive shaft 26. Alternatively, the one-way clutch 24 can be omitted and the drive disc 60 can be coupled directly to the drive shaft 26. The drive disc 60 is located between a pressure disc 62, which is shown in FIG. 8, and a transfer disc 64, which is shown in FIG. 9. One or more friction pads 66 are fixedly attached to each of the pressure disc 62 and the transfer disc 64 and are in contact with the drive disc 60. The transfer disc 64 is fixedly attached to a coupling device 72, which is preferably splined or keyed, for coupling with the rotor 34.

The pressure disc 62 is slidably attached to the transfer disc and the pressure disc and the transfer disc 64 are biased towards one another. This can be accomplished by passing a bolt 74 through both the pressure disc 62 and the transfer disc 64 and placing a biasing means, such as a pressure spring 76 on the bolt between the pressure disc and a nut 78. Drive pins 68 pass through the pressure disc 62 and the transfer disc 64. The drive pins 68 are welded to the transfer disc 64. Both the drive pins 68 and the bolts 74 fit loosely within holes 70 of the pressure disc 62 so that the pressure disc can slide along the drive pins and the bolts. The circumference of the holes 70 is preferably about 5–6 thousandth of an inch larger than the circumference of the drive pins 68 and the bolts 74. If bolts 74 and springs 76 or similar devices are used to bias the pressure disc 62 and the transfer disc 64 towards one another so that the pressure disc and the transfer disc are slidably attached, the drive pins 68 can be omitted from the torque limiting device 28.

In operation, the drive disc 60 turns as the one-way clutch 24 turns. The drive disc 60 drags along with it the pressure disc 62 and the transfer disc 64 and hence the rotor 34 of the power conversion device 32. The pressure disc 62 and the transfer disc 64 are preferably biased towards one another so that if the drive shaft 26 applies an excessive torque to the drive disc 60, as judged by one skilled in the art, the drive disc will slip between the friction pads 66, in which case, the pressure disc 62 and the transfer disc 64 temporarily will not move along with the drive disc 60. Without the use of the torque limiting device, an excessive torque is a torque which would cause wheeled vehicles to have a significant reaction when depressing an actuation member 16, such as but not limited to, shuttering, decreasing in velocity, and recoiling. An excessive torque would also cause excessive wear and tear on the power conversion system. The exact amount of torque that would be considered excessive by one skilled in the art is dependant on several factors such as the size and relationship of the parts of the power conversion system.

Although the present invention has been described in considerable detail with reference to certain preferred versions thereof, other versions are possible. For example, two actuation members can be used in the power conversion system. Therefore, the spirit and scope of the appended claims should not necessarily be limited to the description of the preferred versions contained herein.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

An element in a claim that does not explicitly state "means" for performing a specified function or "step" for performing a specified function, should not be interpreted as a "means" for "step" clause as specified in 35 U.S.C. § 112.

What is claimed is:

1. A power conversion system for actuation by wheeled vehicles traversing a surface, comprising:
   (a) an actuation member supported for movement between a first position projecting above the surface and a second position substantially flush with the surface;
   (b) means for biasing the actuation member toward the first position thereof, the biasing means permitting movement of the actuation member to the second position thereof in response to engagement of the actuation member by a passing vehicle wheel;
   (c) a rotatably mounted drive shaft;
   (d) a one-way clutch coupled between the actuation member and the drive shaft for imparting unidirectional motion to the drive shaft in response to repetitive movement of the actuation member between the first and second positions thereof;
   (e) a coupling between the one way clutch and the actuation member;
   (f) a power conversion device having a rotor and a stator; and
   (g) a torque-limiting device coupled between the drive shaft and the rotor.

2. The power conversion system of claim 1, wherein the actuation member is one of a plurality of actuation members disposed along the surface for serial engagement by the passing vehicle wheel, the biasing means is one of a corresponding plurality of biasing means, and the one-way clutch is also one of a corresponding plurality of one-way clutches coupled between respective ones of the actuation members and the drive shaft.

3. The power conversion system of claim 2, comprising three of the actuation members, biasing means, and one-way clutches.

4. The power conversion system of claim 1, wherein the power conversion device is an electrical generator.

5. A power conversion system for actuation by wheeled vehicles traversing a surface, comprising:
   (a) an actuation member supported for movement between a first position projecting above the surface and a second position substantially flush with the surface;
   (b) means for biasing the actuation member toward the first position thereof, the biasing means permitting movement of the actuation member to the second position thereof in response to engagement of the actuation member by a passing vehicle wheel;
   (c) a rotatably mounted drive shaft;
   (d) a one-way clutch coupled between the actuation member and the drive shaft for imparting unidirectional motion to the drive shaft in response to repetitive movement of the actuation member between the first and second positions thereof;
   (e) a power conversion device having a rotor and a stator; and
   (f) a torque-limiting device coupled between the drive shaft and the rotor, wherein the torque limiting device comprises:
   (g) a drive disc coupled to the drive shaft;
   (h) a transfer disc coupled to the rotor;
   (i) a pressure disc slidably attached to the transfer disc, wherein the drive disc is located between the transfer disc and the pressure disc;
   (j) a first friction pad attached to the transfer disc and located between the drive disc and the transfer disc, where the first friction pad comprises one or more than one friction pad; and
   (k) a second friction pad attached to the pressure disc and located between the drive disc and the pressure disc, where the second friction pad comprises one or more than one friction pad; and
   wherein the pressure disc is biased towards the transfer disc so that the drive disc slips between the friction pads when the drive shaft applies an excessive torque to the drive disc.

6. The system of claim 5, further comprising a one-way clutch coupling the drive shaft to the drive disc.

7. The system of claim 5, wherein the first friction pad comprises a plurality of friction pads.

8. The system of claim 5, wherein the second friction pad comprises a plurality of friction pads.

9. The power conversion system of claim 1, wherein the actuation member has a substantially cylindrical upper wheel-contacting surface, the wheel-contacting surface being adapted for orientation substantially perpendicular to a projected path of the passing vehicle wheels for providing a leading portion of the wheel-contacting surface as a ramp for facilitating smooth passage of vehicle wheels during movement of the actuation member from the first position to the second position thereof.

10. The power conversion system of claim 1, wherein the coupling of the actuation member to the one-way clutch comprises a gear rack member connected to the actuation member; and a pinion meshed with the gear rack member, the pinion driving the one-way clutch.

11. The power conversion system of claim 10, wherein the gear rack member is supported on an axially guided member, and the biasing means comprises a compression spring oriented substantially parallel to the guided member, opposite extremities of the compression spring being interposed between a stationary member and a shoulder member, the shoulder member being rigidly connected to the guided member.

12. The power conversion system of claim 11, wherein the actuation member is rigidly connected to the guided member.

13. A power conversion system for actuation by wheeled vehicles traversing a surface, comprising:
  (a) an actuation member supported for movement between a first position projecting above the surface and a second position substantially flush with the surface;
  (b) means for biasing the actuation member toward the first position thereof, the biasing means permitting movement of the actuation member to the second position thereof in response to engagement of the actuation member by a passing vehicle wheel;
  (c) a rotatably mounted drive shaft;
  (d) a one-way clutch coupled between the actuation member and the drive shaft for imparting unidirectional motion to the drive shaft in response to repetitive movement of the actuation member between the first and second positions thereof;
  (e) a power conversion device having a rotor and a stator;
  (f) a torque-limiting device coupled between the drive shaft and the rotor; and
  (g) a ratio device coupled in series between the drive shaft and the power conversion device for operation of the power conversion device at a different rotational speed than that of the drive shaft when the torque-limiting device is not being loaded to the limiting torque.

14. The power conversion system of claim 13, wherein the ratio device is coupled in series between the torque-limiting device and the power conversion device.

15. The power conversion system of claim 13, wherein the ratio device comprises a gear train.

16. The power conversion system of claim 13, wherein the ratio device is a chain device.

17. A power conversion system for actuation by wheeled vehicles traversing a surface, comprising:
  (a) an actuation member supported for movement between a first position projecting above the surface and a second position substantially flush with the surface;
  (b) means for biasing the actuation member toward the first position thereof, the biasing means permitting movement of the actuation member to the second position thereof in response to engagement of the actuation member by a passing vehicle wheel;
  (c) a rotatably mounted drive shaft;
  (d) a one-way clutch coupled between the actuation member and the drive shaft for imparting unidirectional motion to the drive shaft in response to repetitive movement of the actuation member between the first and second positions thereof;
  (e) a power conversion device having a rotor and a stator;
  (f) a torque-limiting device coupled between the drive shaft and the rotor; and
  (g) a flywheel coupled to the power conversion device, the torque-limiting device being coupled in series between the drive shaft and the flywheel.

18. The power conversion system of claim 17, further comprising a ratio device coupled between the torque-limiting device and the flywheel.

19. The power conversion system of claim 18, wherein the ratio device is a first ratio device, the system further comprising a second ratio device coupled between the flywheel and the power conversion device.

20. The power conversion system of claim 17, further comprising a ratio device coupled between the flywheel and the power conversion device.

21. A power conversion system for actuation by wheeled vehicles traversing a surface, comprising:
  (a) a housing for installation beneath the surface;
  (b) a plurality of longitudinally spaced actuation members supported for independent movement relative to the housing between respective first positions projecting above the surface and respective second positions substantially flush with the surface when the housing is installed beneath the surface, the actuation members each having a substantially cylindrical upper wheel-contacting surface, the wheel-contacting surfaces being adapted for orientation substantially perpendicular to a projected longitudinal path of the passing vehicle wheels for providing respective leading portions of the wheel-contacting surfaces as ramps for facilitating smooth passage of the vehicle wheels during sequential movement of the actuation members from the first positions to the second positions thereof;
  (c) respective springs coupled between the housing and the actuation members for biasing the actuation members toward the first positions thereof, the springs permitting movement of the actuation members to the second positions thereof in response to sequential engagement of the actuation members by a passing vehicle wheel;
  (d) a drive shaft rotatably supported relative to the housing and longitudinally oriented under the surface when the housing is installed beneath the surface;
  (e) a plurality of one-way clutches, each of the one-way clutches being coupled between a corresponding actuation member and the drive shaft for imparting unidirectional motion to the drive shaft in response to repetitive movement of the actuation members between the first and second positions thereof;
  (f) an electric generator having a rotor and a stator for producing electrical power in response to rotation of the rotor;
  (g) a flywheel coupled to the rotor; and
  (h) a slip clutch coupled between the drive shaft and the flywheel.

22. The power conversion system of claim 21, further comprising a ratio device coupled between the flywheel and one of the slip clutch and the rotor.

23. A method of converting momentum of a wheeled vehicle traversing a surface into electricity comprising;
(a) passing a wheeled vehicle over a power conversion system, comprising:
   (i) an actuation member supported for movement between a first position projecting above the surface and a second position substantially flush with the surface;
   (ii) means for biasing the actuation member toward the first position thereof, the biasing means permitting movement of the actuation member to the second position thereof in response to engagement of the actuation member by a passing vehicle wheel;
   (iii) a rotatably mounted drive shaft;
   (iv) a one-way clutch coupled between the actuation member and the drive shaft for imparting unidirectional motion to the drive shaft in response to repetitive movement of the actuation member between the first and second positions thereof;
   (v) a coupling between the one way clutch and the actuation member;
   (vi) a power conversion device having a rotor and a stator; and
   (vii) a torque-limiting device coupled between the drive shaft and the rotor; and
(b) depressing the actuation member with a wheel of a wheeled vehicle.

* * * * *